United States Patent Office 3,379,608
Patented Apr. 23, 1968

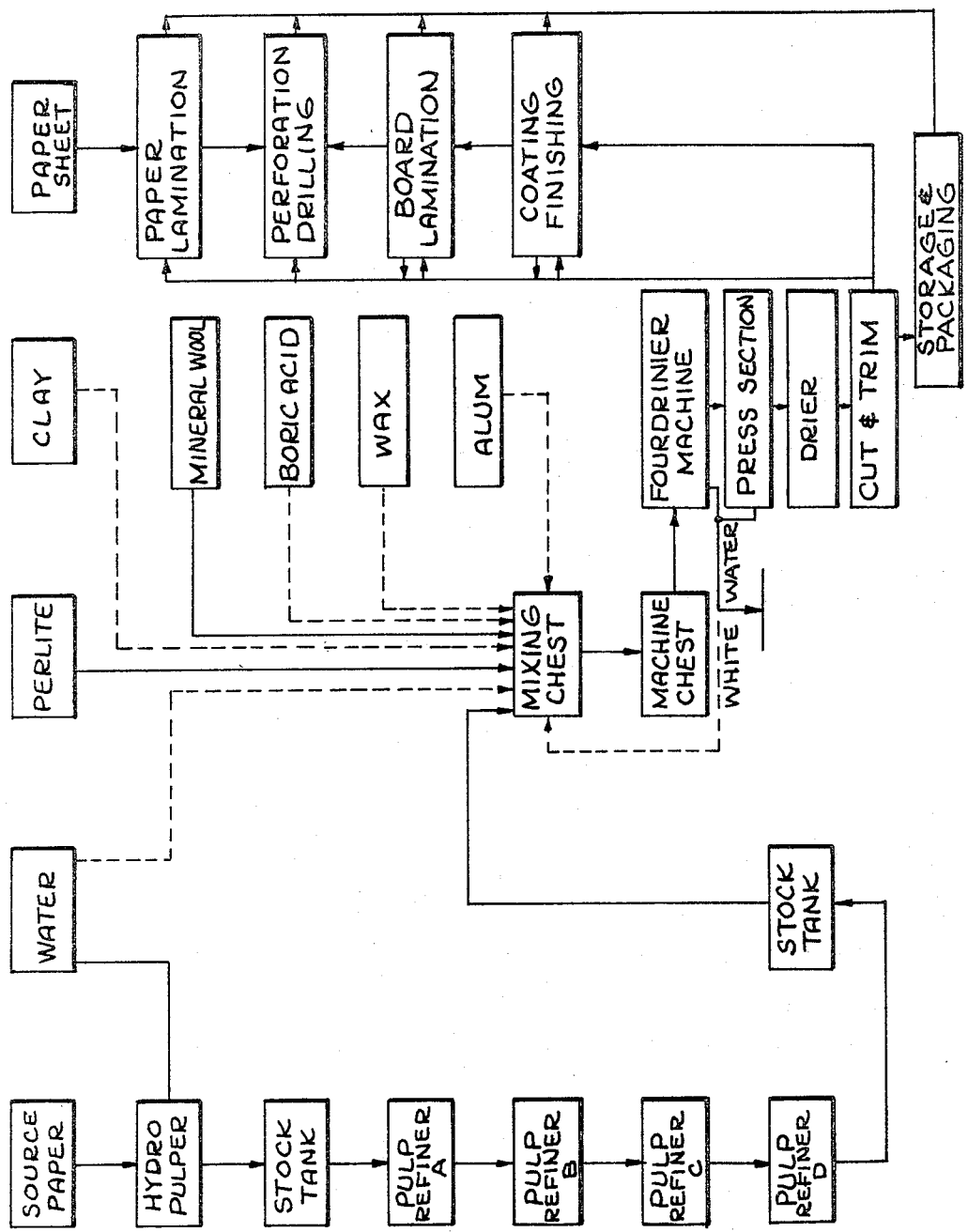

3,379,608
WATER-FELTED MINERAL WOOL BUILDING AND INSULATION PRODUCT INCLUDING NONFIBROUS CELLULOSE BINDER
James R. Roberts, Palatine, Ill., and Frank J. Wendt, Kenosha, Wis., assignors to United States Gypsum Company, a corporation of Delaware
Filed Jan. 16, 1964, Ser. No. 338,056
6 Claims. (Cl. 162—145)

ABSTRACT OF THE DISCLOSURE

A building and insulating product comprising mineral wool, expanded perlite, and a water-activated cellulose binder which is essentially nonfibrous in character.

---

This invention relates to the production of unified building and insulating products and more particularly to light weight unified building and insulating products in sheet form containing a high proportion of mineral wool.

While mineral wool and expanded perlite have each heretofore been used in the manufacture of products and materials which have utility in the field of thermal and acoustical insulation, the products do not have the most desirable community of properties for extended use in the building and construction fields. For example, some products are formulated so as to have excessive weight. Others, while of reduced weight, have low strength or poor structural integrity. Others have poor compression or abrasion resistance. Still others are deficient in fire resistance, acoustical or thermal insulating properties, moisture resistance, or color. Accordingly it would be desirable to provide a lightweight building and insulating product which would have a broad spectrum of desirable physical properties which would in single product eliminate many of the drawbacks found in the materials of the prior art.

It is therefore one object of the present invention to provide a lightweight unified insulation and building product which has superior thermal and acoustical insulation properties.

Another object is the provision of a unified building and insulation product in easily handled sheet form.

A further object is the provision of a unified building and insulating product which has good structural integrity and light weight.

A still further object is the provision of a unified building and insulation product which is also useful as an interior exposed building surface.

A still further object is the provision of a unified building and insulation product which is resistant to fire.

A still further object is the provision of a light weight unified building and insulation product which does not require the use of asphalt, starch or synthetic organic fibers to maintain structural integrity.

A still further object is the provision of a process for manufacture of such a unified lightweight building and insulating products in sheet form by water felting from an aqueous dispersion.

The fulfillment of these and other objects of the present invention may be seen from the following specification, attached drawing, and appended claims.

Accordingly, in one broad form, the present invention is a unified, water felted building and insulation product in sheet form, said product comprising from 5 to 85 percent mineral wool, from 5 to 80 percent perlite, and from 10 to 30 percent of a water activated cellulosic binder having in its original hydrated state a Schopper-Riegler freeness of less than about 100. Preferably the products contain from 20 to 85 percent mineral wool, from 5 to 50 percent perlite and from 10 to 30 percent cellulosic binder. The most preferred products contain from 55 to 85 percent mineral wool, from 5 to 25 percent perlite and from 10 to 20 percent cellulosic binder.

Another broad form of the present invention includes those products which, in addition to mineral wool, perlite and cellulosic binder, contain a ceramic clay. These products comprise in the broadest aspects from 20 to 75 percent mineral wool, from 5 to 40 percent perlite, from 10 to 20 percent cellulosic binder and from 10 to 20 percent ceramic clay.

The percentages in the foregoing and hereinafter are on a dry weight basis.

Another broad form of the present invention comprises a process for producing a water felted unified building and insulating product which comprises forming an aqueous slurry of a cellulosic binder material having a Schopper-Riegler freeness of less than about 100; admixing mineral wool, perlite and other components with the aqueous slurry of said cellulosic binder to form an aqueous dispersion having a consistency of from about 4 to 8 percent, forming a water felted sheet by depositing and accumulating the solids of said dispersion on the screen of a board making machine, compressing and expelling excess water from said water felted sheet, and drying the resulting sheet.

In addition to the components mentioned above, the compositions may optionally contain certain additives for optimum properties and processing characteristics. For example, boric acid may be used in amounts up to about 3 percent, preferably from 0.25 to 2 percent. Wax, when used, is usually in amounts up to about 2 percent by weight, preferably from 0.25 to 1 percent. The wax utilized is usually in the form of an emulsion or dispersion, and may be of several varieties, such as, for example, microcrystalline, paraffin, petroleum, synthetic waxes, etc. Alum may be used in the preferred embodiments for superior processing and product characteristics in amounts of from ½ to 1½ percent.

The mineral wool used in producing the products of this invention is of the conventional wool prepared from blast furnace slag, although other ceramic fibrous products may also be used.

The perlite is the well known thermally expanded product in a variety of mesh sizes. Generally mesh sizes less than 8 mesh are suitable, and with those products which require a smooth finish on the surface, i.e. ceiling tile, perlite in which at least 70 percent passes a 20 mesh screen (U.S. Standard Sieve Series) is preferred.

The clay utilized in certain products of this invention is a ceramic clay, preferably nonswelling and having a highproportion of silica and alumina. Exemplary of such clays are fire clays, ball clays, and the like.

The water activated cellulosic binder used in the present invention has a Schopper-Riegler freeness of less than 100, preferably less than 90. The binder is prepared by forming a slurry or furnish of cellulosic material, preferably of unbleached waste kraft paper. The slurry is then gelatinized by passing through a series of refining and gelatinizing steps to attain the requisite Schopper-Riegler freeness.

As pointed out above, the products of the present invention have a desirable community of physical properties within a single structure. For example, the preferred products of this invention have a high modulus of rupture, preferably from about 100 to 300 p.s.i. The products may be used as underlayment, wall or ceiling insulation, ceiling tile, and the like. Where fireproofing is a desirable requisite, the products may contain from 10 to 20 percent clay. These clay containing products, such as ceiling tile or wallboard, sinter rather than collapse or undergo gross spalling or support combustion when exposed to flame, as in the case of other materials.

As indicated above, the building products can be used for thermal or acoustical insulation. They may be readily sawed, nailed, cut and finished. Their light weight, i.e. densities of from 8 to 25, preferably 8 to 20 pounds per cubic foot, make for ease of handling and installation by workmen. The products may also be used as form boards in poured gypsum decks. Other embodiments include laminated sheets wherein two or more sheets of the product of the present invention are laminated together or where paper sheets are laminated to one or both surfaces of the products of this invention. Drilled or perforated acoustical tile products are also included as specific embodiments of this invention.

For a better understanding of this invention, reference is made to the accompanying drawing illustrating in flow sheet form the sequence involved in the production of the products of the present invention. Referring to that drawing, there is illustrated a paper source, preferably an unbleached kraft waste paper which discharges into a hydropulper, such as preferably of the Morden Slush Maker type, and water is added to form a kraft paper fiber furnish having a consistency, after pulping, of at least about 6 percent. The discharge from the hydropulper passes to a stock tank and then to a series of pulp refiners (A, B, C, D) such as preferably the Morden Stock Maker type refiner equipped with lava tackle. The pulp from refiner A is discharged into refiner B and thence to refiners C and D in cascade fashion, with a total residence time of about 15 seconds. The final product has a Schopper-Riegler freeness of less than about 100. The effect of refining on Schopper-Riegler freeness is shown in the subjoined table.

TABLE 1

| Pulp Sample | Schopper-Riegler Freeness, ml. | Fiber Length Index, mm.[2] |
|---|---|---|
| Unbleached waste kraft pulp stock [1] | 560 | |
| Series Refining: | | |
| After A | 390 | |
| After B | 170 | |
| After C | 110 | 0.061 |
| After D | 80 | 0.058 |

[1] After repulping.
[2] See Forest Products Laboratory Report No. 884, reaffirmed 1956. Also, Schaeffer and Carpenter, Paper Trade Jr. May 1930.

The series refining steps referred to in the above table are passes of the pulp through a Morden Stock Maker type pulp refiner equipped with lava tackle, as referred to above.

The cellulosic binder discharge in slurry form from the refiner sequence is highly hydrated and essentially non-fibrous in character. The cellulose binder slurry is passed to a stock tank for storage, if required. At the necessary intervals the cellulosic binder is passed to a mixing chest where mineral wool and perlite are added as well as clay, boric acid, wax or alum, if desired. Water from source or white water from the Fourdrinier machine may be added to adjust the consistency to from 4 to 8 percent. After mixing to form a uniform product, the resulting dispersion is discharged to a machine chest of the Fourdrinier machine, and thence to the Fourdrinier screen. Other types of paper, board or sheet making machines, such as cylinder machines or the like, may also be used. The water felted sheet of mineral wool, perlite, cellulose binder, and other solids, is accumulated on the Fourdrinier screen or wire in a thickness of from ¾ to 4 inches. The sheet thus formed is then compacted in the press section of the Fourdrinier machine by roller presses or the like, to a final thickness of from about ½ to 1½ inches. The compressed product is passed to a drier preferably of the multiple deck variety. The dried product is trimmed and cut to the desired size and passed to storage, or for further finishing, such as by painting, lamination of sheets, lamination of paper on one or both surfaces, perforation or drilling, or the like.

Insulation products of the present invention made by the foregoing procedure and containing varying amounts of mineral wool, perlite, cellulosic binder and other additives, were prepared. The products are further described as follows:

| Example | Perlite,[1] percent | Cellulosic Binder,[2] percent | Mineral Wool,[3] percent | Clay,[4] percent | Other,[5] percent |
|---|---|---|---|---|---|
| 1 | 7.8 | 14.7 | 75.5 | | 2 |
| 2 | 7.8 | 20 | 70.2 | | 2 |
| 3 | 7 | 12 | 63 | 16 | 2 |
| 4 | 7 | 20 | 71 | | 2 |
| 5 | 9 | 16 | 73 | | 2 |
| 6 | 42.5 | 15 | 42.5 | | |
| 7 | 5.8 | 12.5 | 65.0 | 16.7 | |
| 8 | 77 | 13 | 8 | | 2 |
| 9 | 60 | 15 | 25 | | |
| 10 | 75 | 15 | 10 | | |
| 11 | 10 | 15 | 75 | | |

[1] Screen analysis for perlite: +20 mesh 0%, +50 mesh 7.8%, +100 mesh 36.2%, +200 mesh 23.4%, −200 mesh 27.6%.
[2] Schopper-Riegler freeness of less than 100 (cellulosic binder from unbleached waste kraft).
[3] Debeaded blast furnace slag wool.
[4] Ceramic ball clay—Kentucky-Tennessee Clay Co. CTS-No. 1 Silica 57%; Alumina 27.9%; loss on ignition 9.8%.
[5] 1% boric acid; 1% wax [Mobilcere RV (Mobil Oil Co.) microcrystalline wax emulsion].

As indicated above, the above products have a broad spectrum of useful physical properties. Thus the product of Example 3 had an Underwriters' fire rating for ceiling tile of 3 hours and 18 minutes. Examples 1, 3, 4 and 8 have class A flame spread ratings by Federal Specification SS-A-00118c (GSA-FSS) Apr. 14, 1960, and are rated class 1 by Underwriters' Laboratories Standard 723 (A.S.T.M. E84-61). The product of Example 7 had a modulus of rupture of 206 pounds per square inch at a density of 17.3 pounds per cubic foot. Examples 10 and 11 had noise reduction coefficients (NRC) of .70 to .72.

As previously pointed out, the products of the present invention may be employed for a variety of purposes. Each specific product may be formulated in view of its specific end use requirement. Thus for maximum fire resistance, clay and boric acid are incorporated. High perlite content gives increased hardness levels, which are important in the case of floor underlayment or where boards or sheets must take compression or abrasion abuse. Hardness, as used in this context, is the force in pounds required to force a 2 inch steel ball ¼ inch into the surface of the board. Superior acoustical properties, i.e. acoustic tile and insulation tile, are provided by the incorporation of high levels of mineral wool. Such products are well adapted for reduction of heat loss or transfer or for absorption of sound. Obviously the sheets may be treated and finished with the specific end use in mind. For example, paper sheet may be laminated on one or both surfaces of the water felted tile products to form an attractive surface, as well as provide a high strength product. Such paper sheets are usually of the type used in gypsum board manufacture. Such prodcts are laminated by means of a suitable adhesive, such as polyvinyl acetate emulsion. By such lamination the modulus of rupture greatly increases to levels much higher than the unlaminated sheet.

In one specific example an insulation board containing 78 percent mineral wool, 7 percent perlite and 15 percent cellulosic binder was prepared by the foregoing method. The board, when dried, had a final thickness of about ¾ inch and a density of 19 pounds per cubic foot. Sheets of kraft paper, having a 50 pound per ream (3000 ft.[2]) basis weight, were adhesively united to the surface of the board core using polyvinyl acetate emulsion adhesive (Du Pont Elvacet). The following table shows the increase in modulus of rupture and hardness resulting from lamination.

TABLE 2

| | Modulus of Rupture, Pounds/in.[2] | Hardness, Pounds |
|---|---|---|
| Unlaminated board | 170 | 134 |
| Laminated board | 395 | 161 |

Acoustical products, with or without a laminated paper sheet surface, may also be drilled to make drilled or perforated acoustical tile. The sheet products may also be sanded, striated, or sand blasted.

The process techniques utilized herein are such as known to the paper and board making industry and obvious substitutions of particular apparatus may be made. For example, various types of sheet or board making apparatus may be used to accumulate the felted product into sheet form. The mineral wool is preferably pretreated to remove as much shot or bead as possible. The processed mineral wool usually has a relatively short fiber length averaging 70 percent between 1/16 and 1/8 inch in length, with essentially none longer than 1/4 inch.

One further particular aspect of the process is that the removal of excess water from the felted wet sheet in the press section has an effect on the ultimate density of the final dried sheet product, i.e. within limits (crushing of the perlite) the greater the pressure the higher the density of the final product.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:
1. A method of producing a unified monolithic building product in sheet form which comprises forming a gelatinous cellulosic binder by dispersing a kraft paper fiber in water to form a slurry having a consistency of up to about 6 percent, continuously passing the slurry through a series of pulp refiners preset to gelatinizing conditions for a time and at an intensity to produce an essentially nonfibrous gelatinous slurry having a Schopper-Riegler freeness of up to about 100 ml., and an average particle size on the order of up to about 0.06 mm., admixing from about 10 to 30 weight percent (dry basis) of the cellulosic binder with from 5 to 85 percent mineral wool and from 5 to 80 percent expanded perlite, the major proportion of which perlite has a particle size of greater than 200 mesh and larger than said cellulosic binder particles, forming a slurry of from 4 to 8 percent consistency, forming a wet sheet on a Fourdrinier machine from the dispersion, expelling excess water from the sheet so formed and then drying said sheet.

2. The process of claim 1 wherein the pulp refiners are equipped with lava surfaces.

3. A light weight unified monolithic building product in sheet form, said unified product comprising, on a dry weight basis, from 10 to 30 percent of a mechanically induced water activated cellulosic gelatinous binder having a Schopper-Riegler freeness in its original hydrated state of less than about 100 ml. and prepared from a slurry of kraft paper fibers of a consistency of up to about 6 percent which is subsequently gelatinized by passage through a series of pulp refiners preset to gelatinizing conditions to produce a cellulosic binder having an average particle size on the order of 0.06 mm., from 5 to 85 percent mineral wool, and from 5 to 80 percent expanded perlite, the major proportion of which has a particle size of greater than 200 mesh, said unified product being further characterized in that the average particle size of the cellulosic binder is less than the average diameter of the major proportion of said perlite.

4. The product according to claim 3 wherein the mineral wool is present in an amount of from 20 to 85 percent and the perlite in an amount of from 5 to 50 percent.

5. The product according to the claim 3 wherein the mineral wool is present in an amount of from 20 to 75 percent, the perlite in an amount of from 5 to 40 percent, the cellulosic binder in an amount of from 10 to 20 percent and which contains from about 10 to 20 percent ceramic clay.

6. The product according to claim 3 having a paper sheet laminated on at least one surface thereof.

References Cited
UNITED STATES PATENTS

| | | | |
|---|---|---|---|
| 2,634,207 | 4/1953 | Miscall | 162—181 |
| 2,971,878 | 2/1961 | Heilman et al. | 162—181 X |
| 3,001,907 | 9/1961 | Bergstrom | 162—181 X |

DONALL H. SYLVESTER, *Primary Examiner.*
HOWARD R. CAINE, *Examiner.*